Figure 1:
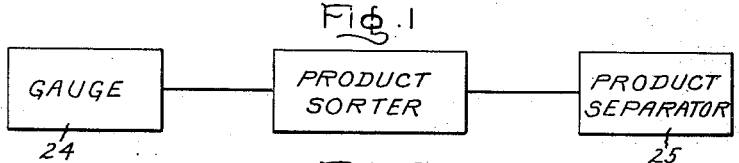

July 8, 1952  J. J. LAREW  2,602,847
PHOTOELECTRIC PRODUCT SORTER
Filed Aug. 3, 1950

Inventor
John J. Larew
by Paul A. Frank
His Attorney

Patented July 8, 1952

2,602,847

UNITED STATES PATENT OFFICE 2,602,847

PHOTOELECTRIC PRODUCT SORTER

John J. Larew, Schenectady, N. Y., assignor to General Electric Company, a corporation of New York Application August 3, 1950, Serial No. 177,466

2 Claims. (Cl. 177—311)

My invention relates to photoelectric control devices and more particularly to a photoelectric product sorter.

It is often necessary to separate the items of a product into a number of discrete predetermined classifications according to a dimension, weight, or some other measurable physical characteristic of the items. Where a certain speed of operation is required, electric or mechanical gauges are used to make the measurement involved and to feed a signal proportional to the measurement into a device which in turn translates the signal into an indication of one of the predetermined classifications which indication is furnished to an operator or controls a mechanism for separating the items according to the classification signal received.

The device employed to receive the gauge signal and indicate an operation is the subject of my invention and will be hereinafter referred to as the product sorter. The device employed to physically separate the items will be hereinafter referred to as the product separator. The product sorters currently in use are extremely expensive and do not find general application. They are usually built for a particular application, and are difficult to convert to a new application.

Therefore, an important object of my invention is to provide an improved and relatively inexpensive product sorting device.

Another object of my invention is to provide a product sorting device which is sufficiently flexible to permit its application with various types of gauges.

In the attainment of the foregoing objects an important feature of this invention resides in a basic meter device having a mirror mounted on the rotatable element thereof with its back surface tangent to the axis of rotation, a source of illumination producing a narrow beam of light, and a number of substantially identical, electric, sorting sections. Each of the sorting sections is composed of a photoelectric cell, an amplifier, a gaseous discharge device, and a relay. All of the amplifiers have a common cathode biasing resistor. The meter is energized by a signal from a gauging device. The mirror reflects the light beam on to one of the photoelectric cells. The signal from the photoelectric cell is amplified and applied to the relay. The contacts operated by each of the relays in the several identical sorting sections are used to operate a product separator.

My invention will be hereinafter described as embodying two substantially identical sorting sections, each section comprising a photoelectric cell, an amplifier, a relay, and a gaseous discharge device. It will be understood, however, that the number of sections employed in any particular embodiment of my invention will depend upon the number of discrete classifications required for a particular application, and upon the limitations in the physical dimensions of the equipment as imposed by each particular application.

Figure 2:
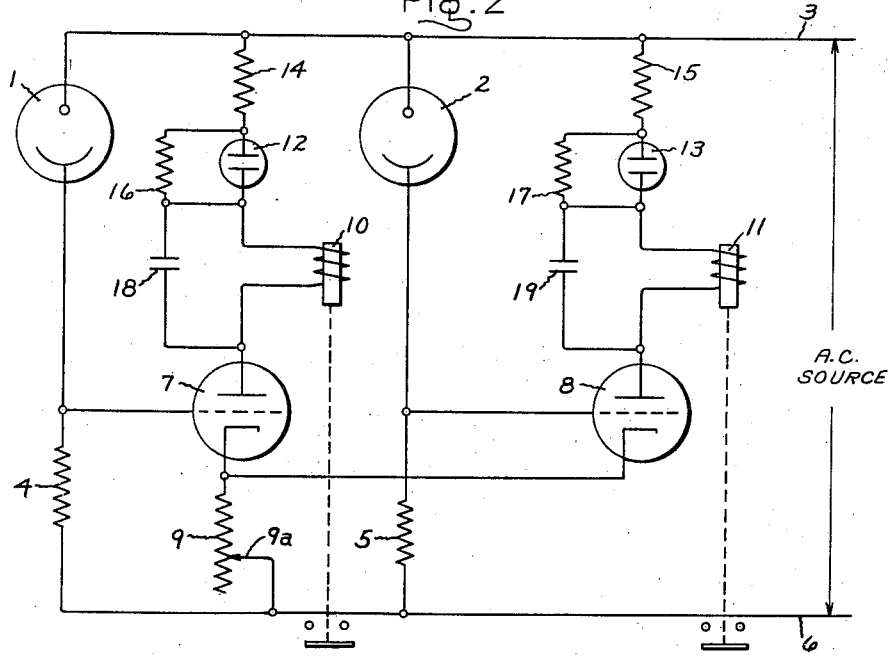
Figure 3:
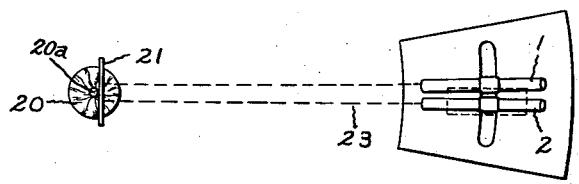
Figure 4:
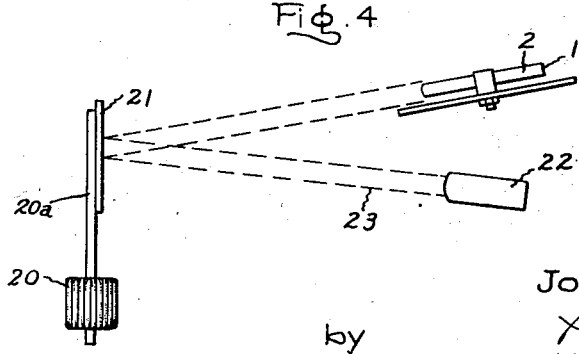

For additional objects and advantages and for a better understanding of this invention, attention is now directed to the following description and the accompanying drawing and also to the appended claims in which the features of my invention believed to be novel are particularly pointed out. Fig. 1 is a block and line diagram of a system embodying my invention; Fig. 2 is a schematic circuit diagram of my invention, Fig. 3 is a plan view of a possible arrangement of the photoelectric cells, the light source, and the mirror for carrying out my invention; and Fig. 4 is a side elevation of the arrangement shown in Fig. 3.

The photoelectric cells 1 and 2 have their anodes connected to a source of alternating voltage by a supply conductor 3. The cathodes of photoelectric cells 1 and 2 are connected to one end of the resistors 4 and 5 respectively. The other ends of resistors 4 and 5 are connected to the alternating source of voltage by supply conductor 6. The control electrodes of the amplifiers 7 and 8 are connected to the cathodes of photoelectric cells 1 and 2 respectively. The cathodes of amplifiers 7 and 8 are all connected to one end of the variable resistor 9. A slider 9a connects the other end of the effective portion of variable resistor 9 to supply conductor 6. The anodes of amplifiers 7 and 8 are serially connected with the operating coils of relays 10 and 11 respectively, the gaseous discharge devices 12 and 13 respectively, and the resistors 14 and 15 respectively. The remaining terminals of resistors 14 and 15 are connected to supply conductor 3. In parallel with gaseous discharge devices 12 and 13, resistors 16 and 17 are respectively connected. The capacitors 18 and 19 are connected in parallel relationship with the operating coils of relays 10 and 11 respectively. A basic meter device, such as an electric meter having a rotatable element 20, is provided having a mirror 21 mounted upon the shaft 20a for rotation about rotatable element 20. Mirror 21 is mounted with its back surface tangent to an element of shaft 20a.

A source of illumination 22 producing a beam of light 23 is disposed so that beam 23 will strike mirror 21 and be reflected thereby onto one of the photoelectric cells. Mirror 21 is of such width that it can receive the full width of beam 23 throughout the full range of its rotation.

Photoelectric cells 1 and 2 are arranged on the arc of a circle having its center on the axis of rotation of mirror 21. The distance between the centers of adjacent electron emitting surfaces of photoelectric cells 1 and 2 is substantially equal to the width of beam 23.

When no signal is applied to rotatable element 20, mirror 21 directs beam 23 to a position somewhat counterclockwise from photoelectric cell 1. At this time, a small amount of current flows in amplifiers 7 and 8 during each positive half cycle of the supply voltage. A signal from a gauging device 24 is applied to the meter causing rotatable element 20 and mirror 21 to be rotated in a clockwise direction through an angle proportional to the signal applied. The signal is any change in voltage, current, frequency, or other quantity, electrical or mechanical which could be made to operate an instrument pointer. When beam 23 is reflected by mirror 21 onto the electron emitting surface of photoelectric cell 1, electrons are emitted therefrom causing a pulsating direct current to flow through photoelectric cell 1 and resistor 4. The potential drop across resistor 4 biases the control electrode of amplifier 7 positively and causes an increase in the pulsating current through amplifier 7.

The increased potential drop across resistor 9 raises the potential of the cathode of amplifiers 7 and 8 with respect to conductor 6, thereby effectively biasing amplifier 8 beyond cutoff. When the potential drop across resistor 16 becomes equal to the critical firing voltage of gaseous discharge device 12, gaseous discharge device 12 fires and there is a sudden increase in the current through amplifier 7. The increased current picks up relay 10 and increases the potential drop across resistor 9, thereby biasing amplifier 8 further beyond cutoff. This increased negative bias on the grid of amplifier 8 blocks current flow through amplifier 8, preventing the firing of gaseous discharge device 13, even though the illumination of photoelectric cells 1 and 2 is almost equal. The firing of gaseous discharge device 12 also gives visual notice of the classification of the item gauged. The contacts operated by relay 10 complete electrical connections to the product separating device 25 and the item gauged is conveyed to the appropriate bin, container, or the like.

When the gauge signal applied to the meter changes, mirror 21 is rotated and swings the reflected portion of beam 23 from photoelectric cell 1 to photoelectric cell 2. The decrease in the illumination of the electron emitting surface of photoelectric cell 1 causes a reduction in current in resistor 4, thereby decreasing the positive bias on amplifier 7. At the same time, the increasing illumination on the electron emitting surface of photoelectric cell 2 causes an increasing positive bias on amplifier 8. On the first positive half cycle of alternating voltage after the potential drop across resistor 5 becomes slightly larger than the potential drop across resistor 4, amplifier 7 is cut off and amplifier 8 conducts as previously described for amplifier 7. Gaseous discharge device 12 remains extinguished until the potential drop across resistor 4 once more becomes slightly greater than that on resistor 5.

The following circuit parameters for one of the signal sorting sections were found to give satisfactory operation with an alternating supply voltage of 115 volts and are presented here as an illustration of their relative magnitudes in one embodiment of my invention:

| | | |
|---|---|---|
| $R_4$ | megohms | 68 |
| $R_9$ | ohms | 10,000 |
| $R_{14}$ | do | 43,000 |
| $R_{16}$ | do | 500,000 |
| $K_{10}$ (relay) | do | 16,000 |
| $C_{18}$ | microfarad | 0.1 |

While the present invention has been described by reference to particular embodiments thereof, it will be understood that this is by way of illustration of the principles involved and that those skilled in the art may make many modifications in the arrangement and mode of operation. Therefore, I contemplate by the appended claims to cover any such modifications as fall within the true spirit and scope of this invention.

What I claim as new and desire to secure by Letters Patent of the United States is:

1. A control for a product classifier comprising a product gauging device having a rotatable indicating element responsive to a physical characteristic of the product measured, a light reflector mounted for rotation with said indicating element, a plurality of light sensitive devices arranged arcuately about said reflector, a source of illumination directing a beam of light into said reflector for reflection selectively onto said light sensitive devices, said beam of light being of a width narrow enough to prevent full illumination simultaneously of any two adjacent light sensitive devices and of a width greater than the distance between said devices; and an electric circuit by which said classifier is made responsive to the angle of movement of said product gauging device, said circuit comprising a plurality of electric signal sorting sections having first and second supply conductors for supplying alternating voltage thereto, each of said sections including one of said light sensitive devices connected to said first conductor and a resistance connection between the discharge side of said light sensitive device and said second conductor, an electronic amplifier associated with said light sensitive device, said amplifier having a control electrode connected on the discharge side of said light sensitive device and an anode connected through a series network to said first conductor, the cathode of each of said amplifiers in said sections being connected together and to a variable resistor connected to said second conductor, said series networks between said first conductor and said amplifier anodes comprising respectively a first resistor, a second resistor in series therewith, a gaseous discharge device in parallel with said second resistor, a capacitor in series with said second resistor and said discharge device, and a relay in parallel with said capacitor, said relay being operative upon the firing of said gaseous discharge device in response to a predetermined potential to operate switching means for said product classifier.

2. A control for a product classifier comprising a product gauging device having a rotatable indicating element responsive to a physical characteristic of the product measured, a mirror mounted for rotation with said indicating element, a plurality of photoelectric cells arranged arcuately about said mirror, a source of illumination directing a beam of light into said reflector for reflection selectively onto said photoelectric cells, said beam of light being of a width sufficiently narrow to prevent full illumination simultaneously of any two adjacent photoelectric cells and of a width greater than the distance between said cells; and an electric circuit for translating the angle of rotatable movement of said product gauging device into a classifying signal, said circuit comprising first and second supply conductors, said first conductor applying alternating voltage to the anode of said photoelectric cells, a resistance connection between the cathodes of said photoelectric cells and said second conductor, an electronic amplifier associated with each of said photoelectric cells, said amplifiers each having a control electrode connected to the cathode of its respective photoelectric cell and its anode connected through a series network to said supply conductor, the cathodes of each of said amplifiers being connected together and to a variable resistor connected to said second conductor, said series networks each comprising a first resistor, a second resistor in series therewith, a gaseous discharge device in parallel with said second resistor, a capacitor in series with said second resistor and said discharge device, and a relay in parallel with said capacitor, said relay being operative upon the firing of said gaseous discharge device in response to a predetermined potential across said second resistor of its series network to operate switching means for said product classifier.

JOHN J. LAREW.

REFERENCES CITED

The following references are of record in the file of this patent:

UNITED STATES PATENTS

| Number | Name | Date |
| --- | --- | --- |
| 1,339,549 | Dixon | May 11, 1920 |
| 1,801,657 | Buyko | Apr. 21, 1931 |
| 1,854,760 | Paulson | Apr. 19, 1932 |
| 1,859,020 | Brown | May 17, 1932 |
| 2,085,671 | Powers | June 29, 1937 |
| 2,415,174 | Hurley, Jr. | Feb. 4, 1947 |
| 2,415,179 | Hurley, Jr. | Feb. 4, 1947 |
| 2,433,559 | Gieseke | Dec. 30, 1947 |
| 2,504,505 | De Tar | Apr. 18, 1950 |
| 2,506,946 | Walker | May 9, 1950 |